United States Patent [19]

Waller

[11] Patent Number: 4,723,768

[45] Date of Patent: Feb. 9, 1988

[54] JIG FOR CONSTRUCTING PIPE SUPPORT BRACKETS

[76] Inventor: George W. Waller, Rte. 13, 190 Strickland Rd., Alpharetta, Ga. 30201

[21] Appl. No.: 896,435

[22] Filed: Aug. 14, 1986

[51] Int. Cl.$^4$ ................................................. B25B 1/20
[52] U.S. Cl. ........................................ 269/41; 269/45; 269/76; 269/88; 269/910
[58] Field of Search ........................ 269/37, 41, 43, 45, 269/130–131, 910, 900, 76, 88

[56] References Cited

U.S. PATENT DOCUMENTS

| | | | |
|---|---|---|---|
| 568,543 | 9/1896 | Parks | 269/45 |
| 1,465,330 | 8/1923 | Ardner | 269/45 |
| 2,458,370 | 1/1949 | Geddes | 269/45 |
| 2,774,134 | 12/1956 | Smith et al. | 269/45 |
| 3,086,767 | 4/1963 | Boser | 269/45 |
| 3,458,182 | 7/1969 | Flachbarth et al. | 269/910 |

FOREIGN PATENT DOCUMENTS 4532480  5/1966  Japan ..................... 269/37

Primary Examiner—Robert C. Watson
Attorney, Agent, or Firm—Newton, Hopkins & Ormsby

[57] ABSTRACT

A jig for constructing pipe support brackets is disclosed, the brackets having a shank portion, an anchoring portion, and a pipe holding portion. The jig has a base member which receives the shank portion and first and second templates which receive the anchoring portions and pipe holding portions respectively, while they are being secured to the shank. The templates may be axially adjustable and pivotally mounted for constructing brackets of different sizes and for facilitating removal of the finished bracket from the jig.

16 Claims, 5 Drawing Figures

JIG FOR CONSTRUCTING PIPE SUPPORT BRACKETS

BACKGROUND OF THE INVENTION

A method and apparatus for supporting pipes in filled dirt is disclosed in my U.S. Pat. No. 4,126,012, issued Nov. 21, 1978. The pipe carriers or supports have several embodiments and are designed to anchor the pipes at a certain level below the surface of the ground.

The pipe supports are constructed, essentially in the entirety, from square or rectangular bar stock, and are normally composed of steel that has been appropriately treated to resist rusting. The bar stock is cut using jigs which are set up only with the appropriate lengths and angles designed therein.

Upon cutting, the assembly procedure was accomplished using clamps or other means to hold the individual pieces together for welding or other suitable securing process. This, however, required a large stock of clamps or other means, and a substantial amount of time and labor, and the assembly process was, therefore, relatively slow.

SUMMARY OF THE INVENTION

It is, therefore, one of the principal objects of the present invention to streamline the assembly of the pipe support brackets by providing a jig in which the pre-cut bracket members may be aligned and secured together.

Another object of the present invention is to provide a jig for constructing pipe support brackets which is adjustable for accommodating various bracket sizes and various embodiments of the pipe holding sections.

A further object of the invention is to provide a jig for constructing pipe support brackets which is simple in consruction and is durable for providing a long service life.

These and additional objects are attained by the present invention which relates to a jig for constructing pipe support brackets having a generally horizontal bed having channel means formed therein for holding the bracket pieces in proper relationship so they may be secured together in a suitable manner. Secured to the bed is a rod means having support elements which may be slidable thereon for holding the pipe support sections so they may be fixed to the body or shank of the bracket.

The bed is constructed of a suitable material, such as wood, which will not be affected by nor interfere with the welding of the brackets. The bed may also have slidable sections for accommodating brackets of various lengths, and access points are provided for welding the bracket on all sides without requiring that the bracket be turned during the fastening operation.

Various additional objects and advantages will become apparent from the below description, with reference to the accompanying drawings.

DETAILED DESCRIPTION OF THE PREFERRED EMBODIMENT

Figure 1:
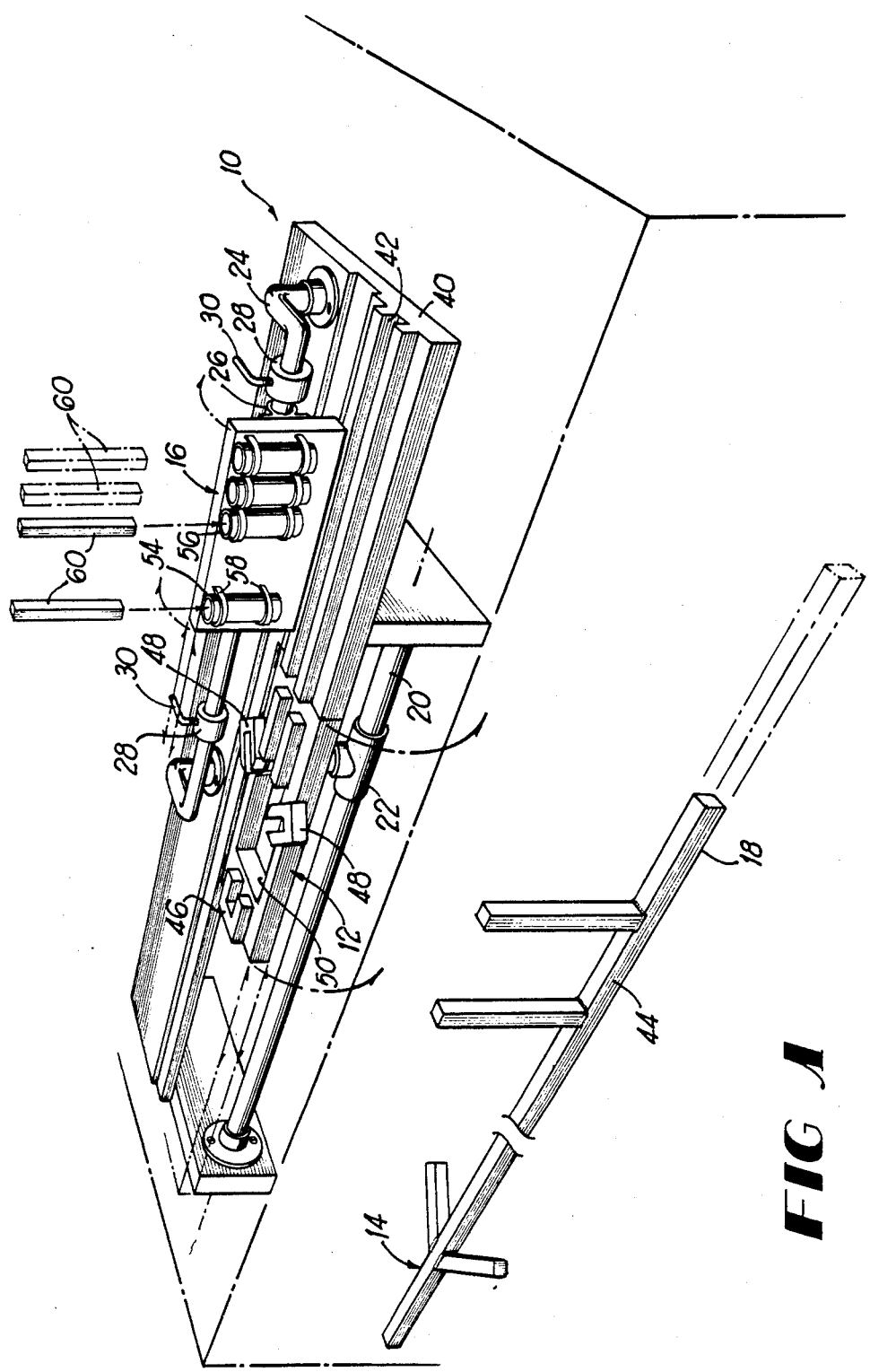
FIG. 1 is a perspective view of the present jig for constructing pipe support brackets, with a bracket projected adjacent the jig, indicating one possible relationship thereto.

Referring now more specifically to the drawings, and to FIG. 1 in particular, numeral 10 designates generally the JIG FOR CONSTRUCTING PIPE SUPPORT BRACKETS. The brackets are disclosed in my U.S. Pat. No. 4,126,012, issued Nov. 21, 1978, which is hereby incorporated by reference for a fuller understanding of the brackets themselves and of the method of installation of the brackets and supported pipes.

The jig, in general, has two sections which will be referred to as upper and lower based on the orientation of the installed pipe support bracket. A first section or lower template 12 is used for construction of the lower portion 14 of the pipe support bracket and a second section or upper template 16 is used for construction of the upper portion 18 of the bracket. The jig is provided in two sections in order to vary the lengths and types of brackets produced.

The first section 12 is mounted on a bar means such as pipe 20, and is axially adjustable thereon. Section 12 is secured to a collar 22 which is mounted for axial movement on pipe 20, as indicated by the directional arrows. The first section is also rotatable on pipe 20 by means of the collar 22, and may be pivoted outwardly and downwardly to ensure easy removal of the finished bracket.

The second section 18 is also mounted on a bar means, such as pipe 24, and is axially adjustable thereon. Section 16 is secured to a collar 26 which is mounted for axial movement on pipe 24, as indicated by the directional arrows. The upper template is also rotatable on pipe 24 by means of the collar 26 and may be pivoted outwardly and downwardly for removal of the finished bracket. Adjustable collars 28, furnished on both sides of the upper template, and secured with suitable means such as set screws 30, serve to hold the upper template in a selected position.

The axial movement of the template serves a dual purpose. The pipe supports may be constructed in varying lengths, and the particular portion of the support under construction may be disposed over an opening in the jig to facilitate welding or otherwise securing the various support members to the main shank of the pipe support above, below and at the sides of the shank.

Figure 1A:
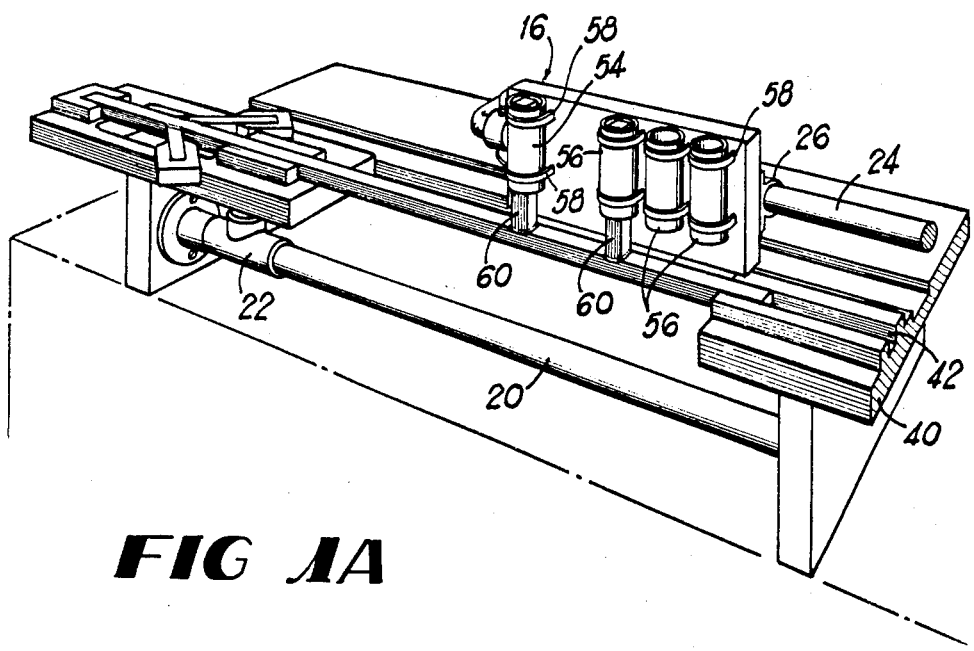
FIG. 1A is a partial, perspective view illustrating one of the steps in the construction of one type of pipe support.
Figure 1B:
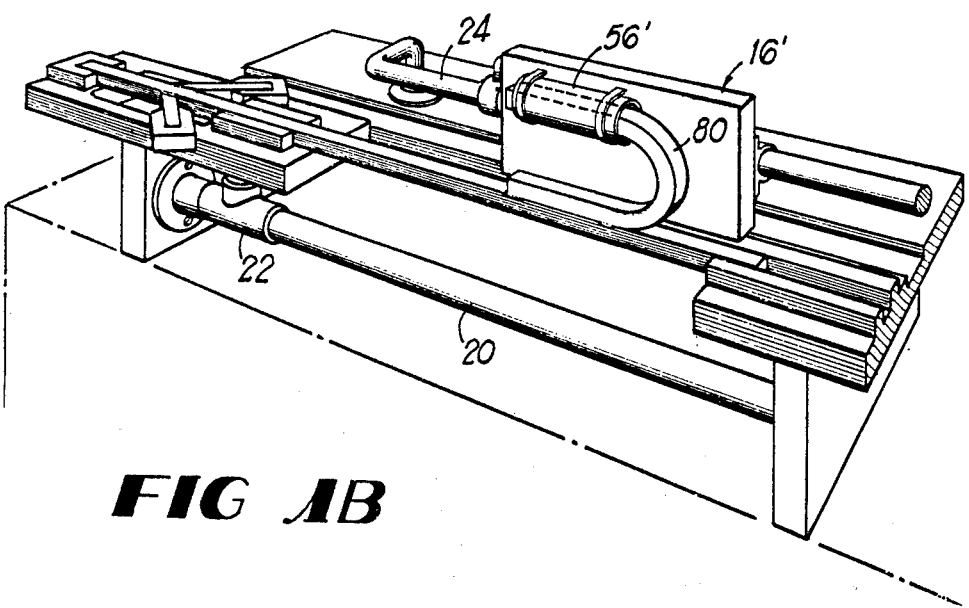
FIG. 1B is a partial perspective view illustrating a step in the construction of a different type of pipe support.

The sequence of construction using the present jig and the method thereof can be seen through reference to FIGS. 1, 1A and 1B. Adjacent the lower template in general axial alignment therewith is a bed portion 40 of the jig, having central channel means 42 formed therein. Channel 42 receives the shank of the pipe support bracket, the bracket beginning as a single, generally straight bar or shank 44.

Figure 2:
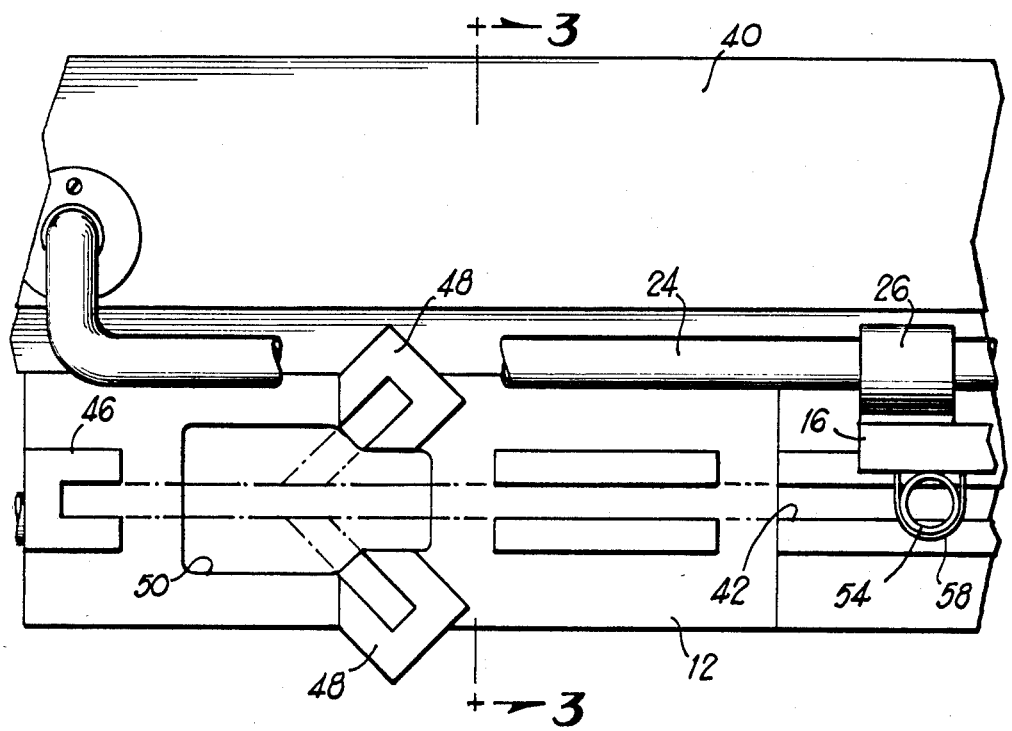
FIG. 2 is a partial, top plan view illustrating the general layout of the present jig.
Figure 3:
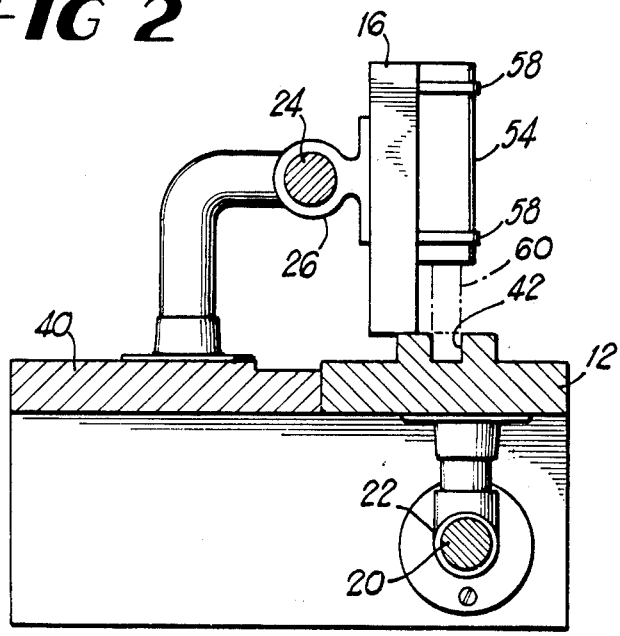
FIG. 3 is a cross sectional view, the view being taken on line 3—3 of FIG. 2.

The lower template has a bottom limiting abutment means 46 and side channel means 48 which together form the template for constructing the lower end of the pipe support bracket. As shown in FIG. 2, the central portion 50 of the template is cut out to provide access to all sides of the bracket.

The bracket members are pre-cut before the assembly operation, a suitable cutting means being employed as described in my U.S. Pat. No. 4,126,012. Thus, the precut shank and barbs 52 are simply laid into the template 12 and suitably fastened, as by welding. The templates and the bed 40 may be composed of any suitable material; however, a treated wood is preferred so as not to interfere with the welding of the brackets and to resist deterioration.

Construction of the brackets normally begins with the lower template in the position shown in FIGS. 1 and 2. The template is slid forward to abut the bed portion 40 and to dispose the cut-out portion 50 in a position where welding may be accomplished to both upper and lower sides of the support bracket. With the barbs secured, the lower template is slid rearwardly from its FIG. 1 position to the position shown in FIGS. 1A and 1B, or to an intermediate position therebetween, in order to provide an access opening beneath the upper end of the shank for connection of the pipe support members.

As my prior patent discloses, the pipe support members may be formed as straight, parallel bars, U-shaped cradles, or ring-shaped holders. For illustration, templates are shown in FIGS. 1A and 1B for construction of supports having straight, parallel bars and U-shaped cradles, template 16' in FIG. 1B for a U-shaped cradle. These templates are provided as examples, and templates for construction of the other forms of the brackets are meant to be included within the scope of the present invention.

The upper templates, as noted, are axially adjustable on pipe 24, which, in combination with the adjustable lower template, permits construction of the support brackets in any desired length. Template 16 includes a lower holding means or vertical tube 54 and a plurality of upper holding means or vertical tubes 56. The tubes may be secured to the template in any suitable manner, as with straps 58. The parallel bars 60 are inserted into selected tubes, depending on the diameter of the pipe to be held, and are secured to the shank 44 in a suitable manner, as by welding. The welding or other securement operation is facilitated by the access opening provided beneath the template 16 when it is adjusted rearwardly as shown in FIGS. 1A and 1B.

FIG. 1B illustrates a support bracket being constructed using template 16' for forming a U-shaped pipe cradle. The cradle is held by pipe section 56' while welding or other securement operation is being performed to fasten the cradle to the shank. The cradle may, of course, be mounted with the open end facing in either direction. Similarly, the tube sections 56 and 56' are designed such that the sections shown in FIG. 1A can be removed along with straps 58 and re-oriented to the position shown in FIG. 1B, thereby enabling the use of a single template to produce the various pipe support brackets. Where individual templates are made and used for each type of bracket, they may be easily changed by removing the template from collar 26.

Upon completion of the bracket construction procedure, either or both upper and lower templates may be pivoted outwardly and/or downwardly to permit removal of the finished bracket. Removal may also be accomplished by removal of the tube sections 56, thereby freeing the finished bracket for removal.

The use and operation of the present jig for constructing pipe support brackets is substantially as described hereinabove. The brackets may thus be constructed quickly and uniformly, helping to insure the integrity of the pipes to be supported thereon. Due to the security of holding pivoted by the templates, the entire jig may also be disposed in a vertical position as opposed to the horizontal position shown, and such disposition is meant to be covered by the present invention.

While an embodiment of a jig for constructing pipe support brackets and modifications thereof have been shown and described in detail herein, various other changes and modifications may be made without departing from the scope of the present invention.

I claim:

1. A jig for constructing a pipe support bracket which is designed for generally vertical insertion into the ground or similar medium, having a shank portion with an anchoring member and pipe holding member connected thereto said anchoring member disposed near the lower end of said shank and said pipe holding member disposed near the upper end thereof, said jig comprising a base member having an axially movable section and a fixed section for receiving the shank portion of said bracket a first template means disposed on said movable section and having an aperture formed therein for holding the anchoring member during its securement to the shank portion for accommodating shank portions of varying lengths, and for providing access below said shank portion for securement of said anchoring means and a second template means for holding the pipe holding member during its securement to the shank portion.

2. A jig as defined in claim 1 in which said second template means is axially adjustable with respect to the shank portion.

3. A jig as described in claim 1 and including a first rod means mounted below and parallel to said base member for receiving said first template means.

4. A jig as described in claim 3 and including a second rod means mounted above and parallel to said base member for receiving said second template means.

5. A jig as defined in claim 4 in which said first and second template means are axially adjustable on said respective first and second rod means.

6. A jig as defined in claim 4 in which said first and second template means are pivotally mounted on said respective rod means.

7. A jig as defined in claim 1 in which said base member includes a channel means formed therein for receiving the shank portion and said anchoring member.

8. A jig as defined in claim 7 in which said second template means includes a plurality of holding means for constructing pipe support brackets having differing configurations.

9. A jig as defined in claim 8 in which said holding means may be disposed substantially parallel to and substantially perpendicular to the shank portion of the bracket.

10. A jig for constructing a pipe support bracket, said bracket having a generally vertical shank portion, with an anchoring means designed for attachment near the lower end of said shank portion, and pipe support means designed for attachment near the upper end of said shank portion, said jig comprising a base member having at least one axial channel formed therein for receiving the shank portion of the bracket, said base member also having a movable portion for receiving the lower end of said shank portion and a fixed portion for receiving the upper end of said shank portion, first and second template means with at least one of said template means being axially adjustable with respect to the shank portion, said first template means having channel means in communication with said axial channel for holding the anchoring means during securement thereto to the shank portion and said second template means having holding means for receiving the pipe support means during securement thereof to the shank portion.

11. A jig as defined in claim 10 in which both of said template means are axially adjustable with respect to the shank portion.

12. A jig as defined in claim 10 and including a first rod means mounted below and parallel to said base member for receiving said first template means.

13. A jig as defined in claim 12 and including a second rod means mounted above and parallel to said base member for receiving said second template means.

14. A jig as defined in claim 13 in which said first and second template means are axially adjustable on said respective first and second rod means.

15. A jig as defined in claim 13 in which said first and second template means are pivotally mounted on said respective rod means.

16. A jig as defined in claim 15 in which said first and second template means are axially adjustable on said respective first and second rod means.

* * * * *